United States Patent
Ammann

(10) Patent No.: US 8,350,757 B2
(45) Date of Patent: Jan. 8, 2013

(54) METHOD OF PROCESSING A DIGITAL SIGNAL DERIVED FROM AN ANALOG INPUT SIGNAL OF A GNSS RECEIVER, A GNSS RECEIVER BASE BAND CIRCUIT FOR CARRYING OUT THE METHOD AND A GNSS RECEIVER

(75) Inventor: Michael Ammann, Hunenberg (CH)

(73) Assignee: u-blox AG, Thalwil (CH)

( * ) Notice: Subject to any disclaimer, the term of this patent is extended or adjusted under 35 U.S.C. 154(b) by 0 days.

(21) Appl. No.: 13/090,703

(22) Filed: Apr. 20, 2011

(65) Prior Publication Data

US 2011/0193745 A1    Aug. 11, 2011

Related U.S. Application Data

(62) Division of application No. 12/155,379, filed on Jun. 3, 2008, now Pat. No. 7,940,212.

(30) Foreign Application Priority Data

May 26, 2008    (EP) ..................................... 08405145

(51) Int. Cl.
   *G01S 19/37*    (2010.01)
   *G01S 19/35*    (2010.01)
(52) U.S. Cl. .............................. 342/357.75; 342/357.77
(58) Field of Classification Search ............... 342/357.4, 342/357.68, 357.75, 357.77; 701/213, 215, 701/468
See application file for complete search history.

(56) References Cited

U.S. PATENT DOCUMENTS

| | | | |
|---|---|---|---|
| 4,489,435 A * | 12/1984 | Moshier | 704/244 |
| 4,807,256 A * | 2/1989 | Holmes et al. | 375/344 |
| 5,497,395 A | 3/1996 | Jou | |
| 6,126,599 A * | 10/2000 | Jago et al. | 600/437 |
| 6,298,083 B1 | 10/2001 | Westcott et al. | |
| 6,330,292 B1 | 12/2001 | Dent et al. | |
| 6,567,483 B1 | 5/2003 | Dent et al. | |
| 6,847,378 B2 * | 1/2005 | Oberoi et al. | 345/600 |
| 6,850,557 B1 | 2/2005 | Gronemeyer | |
| 7,359,429 B2 | 4/2008 | Valio et al. | |
| 2008/0232441 A1 | 9/2008 | Mester et al. | |

* cited by examiner

Primary Examiner — Dao Phan

(57) ABSTRACT

An acquisition unit of a GNSS receiver base band circuit includes an integrator with a number of preprocessors where an incoming digital signal is mixed with different frequency signals to compensate at least in part for clock drift and Doppler shifts. The resulting digital signals are, after an accumulation step reducing sample frequency, integrated over an integration period extending over several basic intervals of the length of a basic sequence characteristic for a GNSS satellite, so that samples separated by a multiple of the basic interval are superposed. The resulting data sequence of 1,023 digital values is stored in one of two memories and then, in mixers, sequentially shifted by post-integration frequencies which are multiples of the inverse of the length of the basic interval. The pre-integration frequencies employed in the preprocessors deviate, with one possible exception, from the post-integration frequencies and are usually smaller.

11 Claims, 6 Drawing Sheets

METHOD OF PROCESSING A DIGITAL SIGNAL DERIVED FROM AN ANALOG INPUT SIGNAL OF A GNSS RECEIVER, A GNSS RECEIVER BASE BAND CIRCUIT FOR CARRYING OUT THE METHOD AND A GNSS RECEIVER

This is a Division of application Ser. No. 12/155,379 filed Jun. 3, 2008. The disclosure of the prior application is hereby incorporated by reference herein in its entirety.

FIELD OF THE INVENTION

The invention concerns a method for processing a digital signal derived from an analog input signal of a GNSS receiver which contains signals emitted by satellites of GNSS (Global Navigation Satellite System) positioning systems like GPS, GLONASS and GALILEO in order to determine a position. The invention also concerns a base band circuit for carrying out the method and a GNSS receiver comprising such base band circuit.

PRIOR ART

A method of the generic type is known from US 2006/0056 497 A1. Here a digital signal is mixed with one frequency signal to tentatively compensate for clock drift and Doppler shifts and an integration carried out where values of the resulting signal which are separated by the length of a basic interval taken up by a basic sequence characteristic for the signal emitted by at least one of the GNSS satellites are summed up over a longer integration interval. The resulting data sequence is stored in a memory unit and then read out and immediately used for determining correlation values indicating the degree of correlation between the data sequence and the basic sequence.

This acquisition process is rather slow, in particular if a large number of different frequency signals must be tried out in the process of searching for adequate compensation of clock drift and Doppler shifts.

SUMMARY OF THE INVENTION

It is a general object of the invention to improve and in particular accelerate signal acquisition and specifically to shorten the time lapse between the beginning of operations and acquisition of a sufficient number of signals emitted by GNSS satellites to allow a first assessment of the position of the GNSS receiver.

Due to clock drift and Doppler shifts, it is usually necessary to try out a considerable number of compensation frequencies which can be time-consuming. In accordance with a first aspect of the invention a method is therefore presented which allows speeding up the search for an adequate compensation frequency. For this purpose, groups of part-compensated data sequences are produced with different frequency signals which after integration are shifted in the frequency domain by multiples of the inverse of the basic interval. This can be done with existing data sequences at a high clock rate independently from the slower process of preparation of data sequences from fresh data.

Beside or in stead of being used to reduce acquisition time the advantage gained by the features of the invention may wholly or in part be used to achieve a reduction of the price of the GNSS receiver as higher clock drift becomes acceptable because a larger frequency interval can be scanned during a given time span. This opens a wider choice of TCXOs or XTOs due to relaxed quality requirements.

A GNSS receiver base band circuit suitable for carrying out the method according to this aspect of the invention and a GNSS receiver comprising such GNSS receiver base band circuit are proposed as well.

Under a further aspect of the invention the acquisition process is improved by producing, from the digital signal, an accumulated digital signal which contains only one sample per chip for fast and easy processing.

A GNSS receiver base band circuit suitable for carrying out the method according to this aspect of the invention and a GNSS receiver comprising such GNSS receiver base band circuit are again proposed as well.

Under a still further aspect of the invention the correlation process is accelerated in that two or more consecutive data values of the data sequence and binary values of the correlation sequence are processed in a single step whereby the time required for the correlation process is reduced by a corresponding factor.

Again, a GNSS receiver base band circuit suitable for carrying out the method according to this aspect of the invention and a GNSS receiver comprising such GNSS receiver base band circuit are proposed as well.

BRIEF DESCRIPTION OF THE DRAWINGS

In the following the invention is described in more detail with reference to drawings showing an embodiment of the invention where.

DESCRIPTION OF THE PREFERRED EMBODIMENTS

Figure 1:
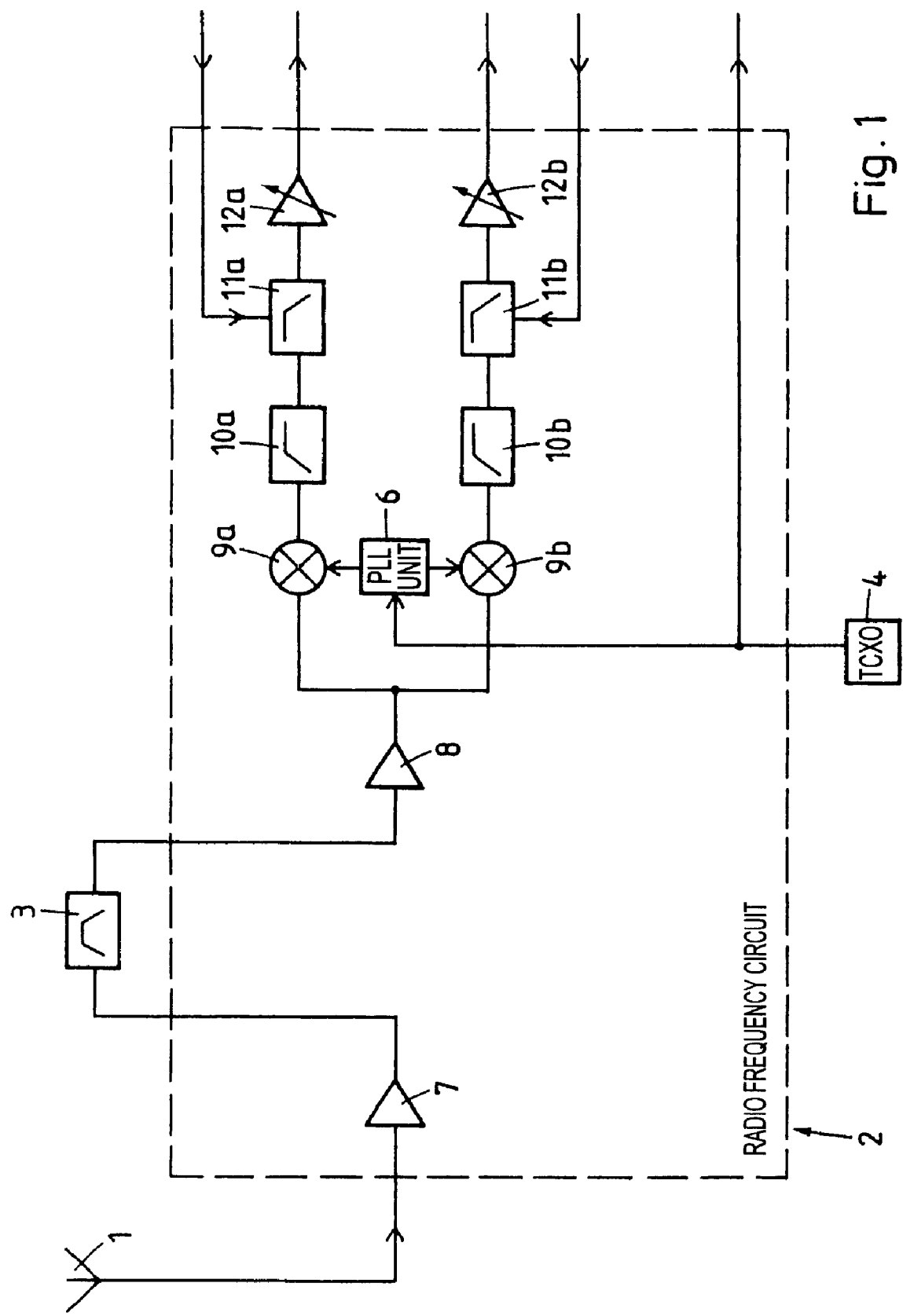
FIG. 1 shows a radio frequency circuit of a GNSS receiver according to the invention.
Figure 2:
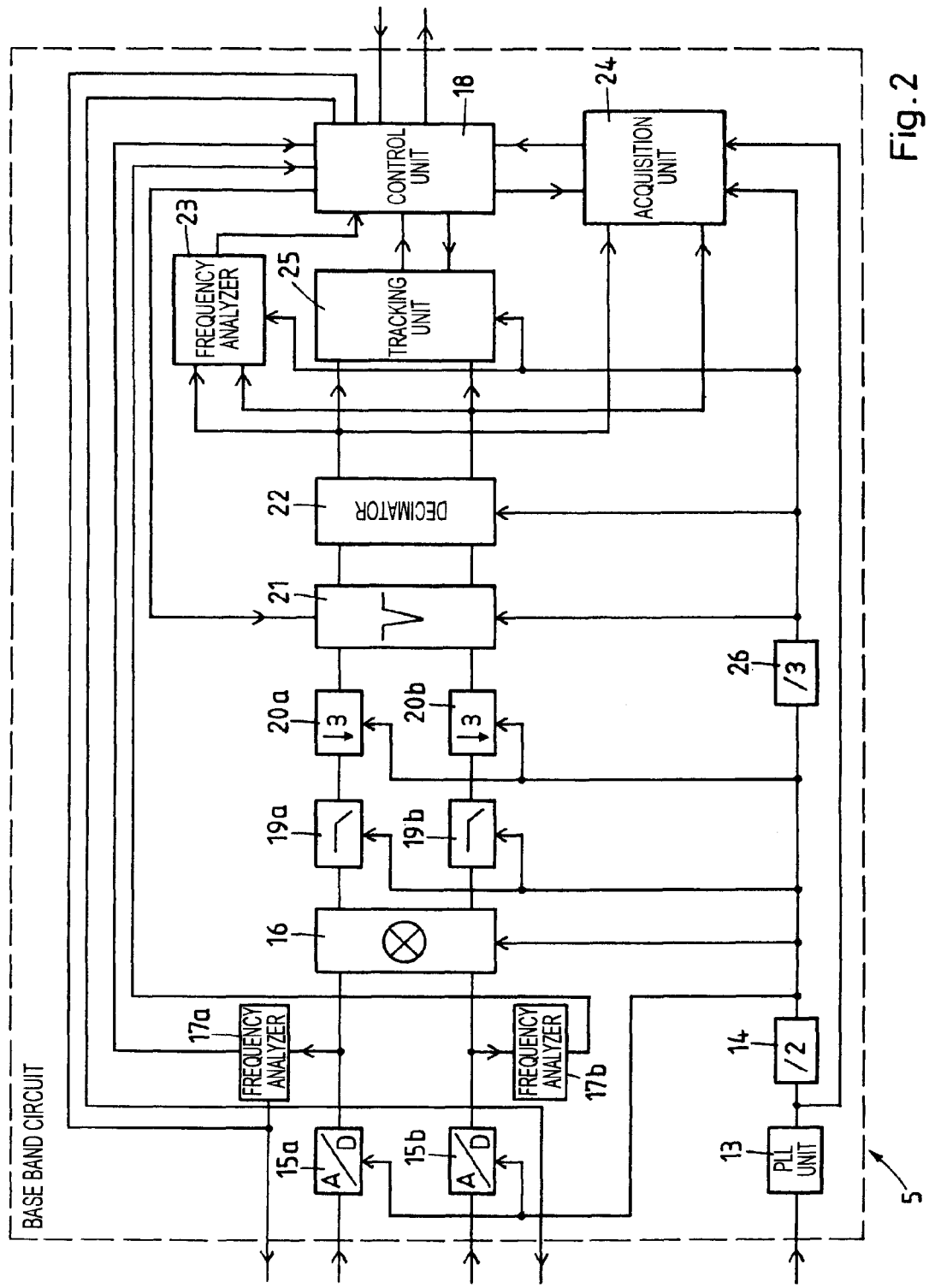
FIG. 2 shows a base band circuit of a GNSS receiver according to the invention.

The embodiment described in the following is a receiver suitable for GPS. However, the modifications which are necessary if other systems like GLONASS or GALILEO are to be used are generally straightforward. The receiver comprises (FIG. 1) an antenna 1 followed by a radio frequency circuit 2, a bandpass filter 3, a TCXO (temperature compensated crystal oscillator) 4 or XTO (crystal oscillator) and (FIG. 2) a base band circuit 5. It is advantageous to implement the radio frequency circuit 2 and the base band circuit 5 each on a separate semiconductor chip but other solutions are also possible.

The bandpass filter 3, usually an SAW (surface acoustic wave) filter, is a component external to the radio frequency circuit 2. The TCXO 4, also a separate component, provides a basic frequency of between 19 MHz and 40 MHz, e.g., 26 MHz, which is fed to the radio frequency circuit 2 and further to the base band circuit 5. In the radio frequency circuit 2 the output signal of TCXO 4 controls a PLL unit 6 which produces a 3'158 MHz clock signal from which two further clock signals with half the clock rate, i.e., 1'579 MHz, are derived with one of the clock signals phase-shifted by 90° with respect to the other.

The antenna input of the radio frequency circuit 2 is followed by a low noise amplifier 7 which is connected, via the external band pass filter 3 and a controllable RF amplifier 8, to mixers 9a,b which also receive the clock signals from PLL unit 6. Together they form a complex mixer which provides an I and Q component of a complex analog signal shifted down to an intermediate frequency of approximately 3 MHz. They are each followed by a high pass filter 10a; b with a cutoff frequency of about 20 kHz and a controllable low pass filter 11a; b with a cutoff frequency of around 7.5 MHz connected to the output of the radio frequency circuit 2 via programmable gain amplifiers 12a; b.

The output of radio frequency circuit 2 is connected to an input of the base band circuit 5. The output signal of TCXO 4 is, via radio frequency circuit 2, also fed to the base band circuit 5 where it controls a PLL unit 13 producing a clock signal with a clock rate of 48 MHz which is reduced to 24 MHz by a subsequent frequency divider 14. Directly at the input of the base band circuit 5 A/D converters 15a,b with 5 bit resolutions are provided for sampling the input signal with a sampling rate of 24 MHz, producing a complex digital signal which is fed to a complex digital mixer 16 that shifts the center frequency to base band and to frequency analyzers 17a,b whose outputs are connected to a control unit 18 which controls low pass filters 11a,b in radio frequency circuit 2. The mixer 16 is followed by decimation filters 19a,b, each with a cut-off frequency of 3 MHz, and down-samplers 20a;b. A/D converters 15a,b, mixer 16, frequency analyzers 17a,b, decimation filters 19a,b and down-samplers 20a,b are clocked by the 24 MHz clock signal from frequency divider 14.

A band stop unit 21 for filtering a raw digital signal by removing continuous wave signals and a decimator 22 for reducing the filtered digital signal from 6 to 3 bits are followed by a frequency analyzer 23 whose output signal is used by control unit 18 to control the band stop unit 21 and by an acquisition unit 24 for identifying components of the signal as emitted by specific satellites of the GNSS system as well as by a tracking unit 25 for continually tracking the said signal components and analyzing their time delays and for extracting data bits from them.

A frequency divider 26 produces, from the 24 MHz clock signal output by frequency divider 14, a 8 MHz clock signal which clocks band stop unit 21, decimator 22, frequency analyzer 23, acquisition unit 24 and tracking unit 25. The acquisition unit 24 also receives the 48 MHz clock signal from PLL unit 13. The control unit 18 receives data from the tracking unit 25 which, apart from the time delays of signals emitted by the individual satellites, comprise almanac and ephemeris data extracted from the said signals. From these data the control unit 18 calculates the position of the GNSS receiver. The calculations which may also involve additional data stored in the receiver or transmitted to it via some additional link are carried out in ways well known in the art. The control unit 18 also controls the acquisition unit 24 and the tracking unit 25.

After the analog signal received by the antenna 1 (FIG. 1) has been amplified by low noise amplifier 7 its spectrum is reduced to a 30 MHz band centered at the GPS frequency of 1'575.42 MHz by band pass filter 3. After further amplification and mixing any DC component is removed by high pass filters 10a,b and high frequencies are suppressed by low pass filters 11a,b for anti-aliasing. The low pass filters 11a,b are controlled by the control unit 18 (FIG. 2) based on the outputs of frequency analyzers 17a;b in such a way that the signal is, with respect to the signal at a reference frequency of 3 MHz, attenuated by not more than −3 dB at 7.5 MHz and by at least −12 dB at 12 MHz, i.e., at half the sampling rate of A/D converters 15a,b at the input of base band circuit 5. The programmable gain amplifiers 12a,b adjust the signal to the input range of the A/D converters 15a,b.

The amplified and filtered complex analog signal is then converted to a complex digital signal by A/D converters 15a,b of base band circuit 5 and then derotated, i.e., its center frequency shifted essentially to zero by complex digital mixer 16. After its spectrum has been limited to a 3 MHz frequency band by decimation filters 19a,b, its sampling rate is reduced to 8 MHz by down-samplers 20a; b. This raw digital signal which is restricted to a fixed signal frequency band extending from −3 MHz to +3 MHz is then fed to band stop unit 21 for filtering. Several continuous wave interferers can be suppressed with only negligible distortion of the raw digital signal to produce a filtered digital signal restricted to the same signal frequency band. In a next step the filtered digital signal is requantized from 6 bits to 3 bits in the decimator 22 which uses a non-linear decimation table. The resulting digital signal is then fed in parallel to frequency analyzer 23, tracking unit 25 and acquisition unit 24.

In the acquisition unit 24 a data sequence derived from this digital signal is correlated with internally produced characteristic sequences of GNSS satellites at various frequency shifts and with various phase shifts. For this purpose the sample frequency is reduced to approximately 1 MHz. This allows efficient processing of the samples and fast lock-on to received satellite signals.

In the tracking unit 25, where the same sequences, frequencies and phase shifts are applied as have yielded high correlation values in the acquisition unit 24, the high sample frequency of 8 MHz allows for a very precise determination of the positions of the correlation peaks and associated phases of the said satellite signals which in turn allows a precise calculation of receiver position. The results from frequency analyzer 23 which may be a part of the tracking unit 25 using channels with varying scanning frequencies and constant sequences, are employed for the detection of any continuous wave interferers and determination of their interferer frequencies which are then used by the control unit 18 for controlling band stop unit 21 in such a way that the interferer frequencies are suppressed. The interferer frequencies can be identified by cyclical sweeping through the raw signal frequency band in steps of, e.g., 1 kHz and comparing the individual energy densities with a mean over the entire frequency band.

Figure 3:
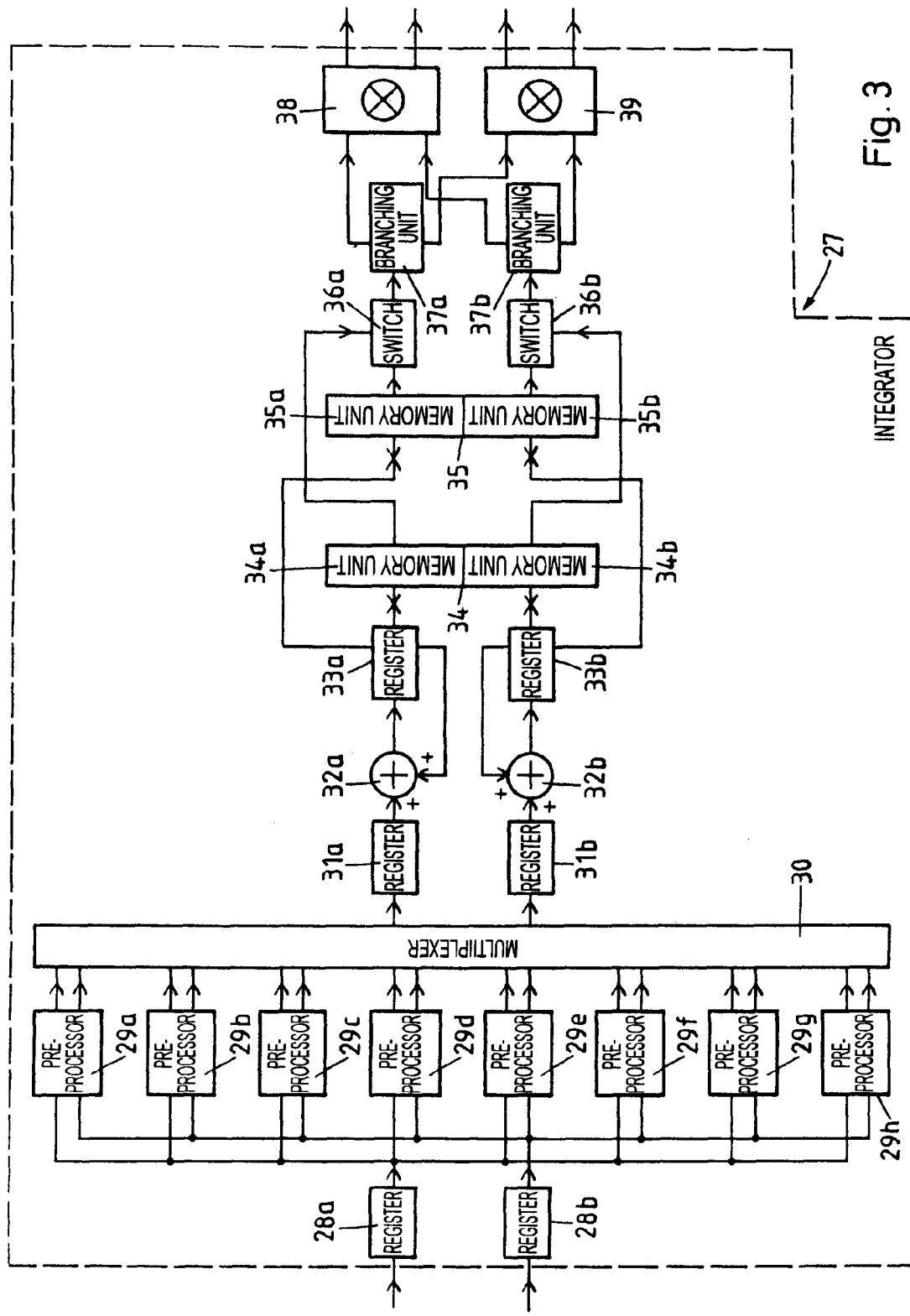
FIG. 3 shows an integrator of an acquisition unit forming part of the base band circuit of FIG. 2.

The acquisition unit 24 comprises three subunits. Its input is connected to the input of an integrator 27 (FIG. 3) with registers 28a,b followed by preprocessors 29a-h, each of them for shifting the frequency by a specific amount to compensate for possible Doppler shifts and clock drift and afterwards reducing the sample frequency to about 1.023 MHz. The preprocessors 29a-h are, via a multiplexer 30, connected to registers 31a,b.

Figure 4:
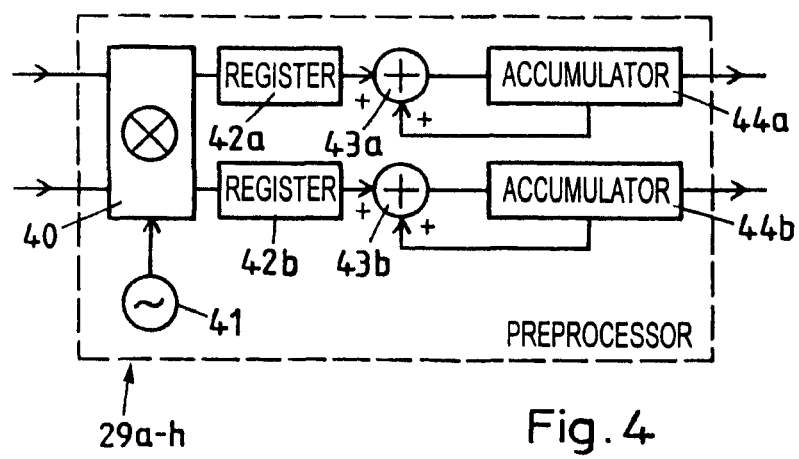
FIG. 4 shows a preprocessor of the integrator of FIG. 3.

Each of the registers 31a;b is followed by a limiting adder 32a;b connected to a register 33a; b which can in turn be connected to either a memory unit 34a; b of a first RAM-type memory 34 or a memory unit 35a;b of an equal second RAM-type memory 35. Via further switches 36a; b either the memory units 34a; b or the memory units 35a; b can be connected to branching units 37a; b which are followed by complex mixers 38, 39 whose outputs are connected to two pairs of output lines of the integrator 27. Each of the memory units 34a,b, 35a,b contains, for each of the eight preprocessors 29a-h, a number of 7 bit memory cells which corresponds to the number of samples received during a basic interval, in the example 1'023. The address where a value is stored is determined by a number identifying the preprocessor and the number of the sample, counted from the beginning of the basic interval. Preferably, the values pertaining to a specific preprocessor are stored, in chronological order, under consecutive addresses. From the memories 34, 35 two values pertaining to consecutive samples from one of the preprocessors 29a-h are in each case retrieved at the same time and then separated by the branching units 37a,b and directed to mixers 38 and 39, respectively. Each of the preprocessors 29a-h comprises (s. FIG. 4) a complex mixer 40 which receives the 8 MHz data signal from the input lines of the acquisition unit 24 and the output signal of a numerically controlled oscillator 41. The output of the mixer 40 is connected to registers 42a,b which are each followed by an adder 43a;b and an accumulator 44a;b which is connected to an input of the adder 43a;b.

Figure 5:
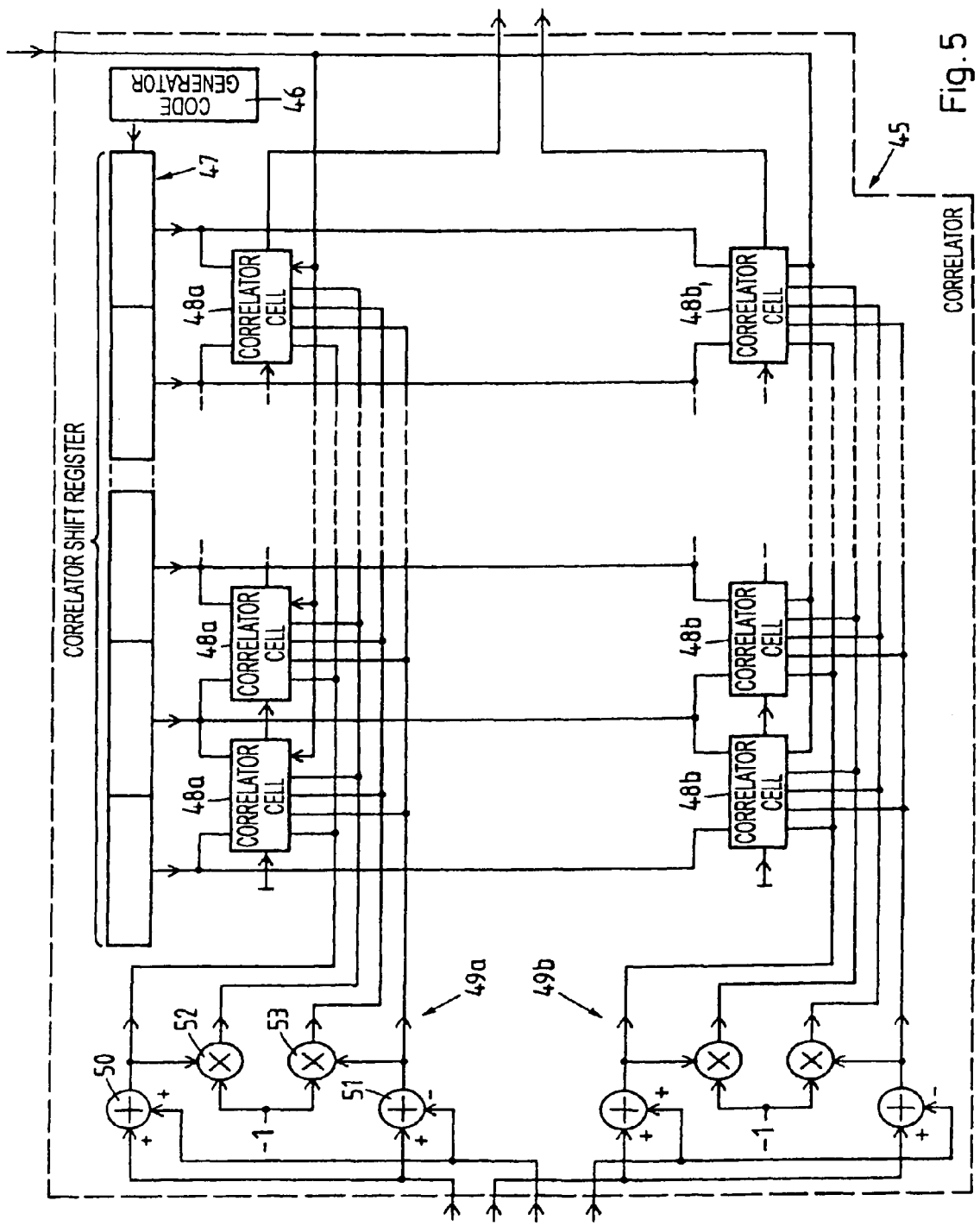
FIG. 5 shows a correlator of the acquisition unit.

The integrator 27 is followed by a correlator 45 (FIG. 5). It comprises a code generator 46 followed by a correlator shift register 47 with N memory cells where N is preferably either the length of the basic sequence, i.e., 1'023, or a number having a multiple which equals the said length or is close to it, e.g., N=32, 64, 93, 128, 256, 341 or 512. Each pair of consecutive cells of the correlator shift register 47 is connected to two correlator cells 48a, 48b.

The correlator cells 48a form a first row of N correlator cells connected to a first evaluation unit 49a which comprises two adders 50, 51 connected in parallel to two of the input lines of the correlator 45, the adder 50 having two direct, non-inverting inputs and the adder 51 one direct input and one inverting input. Their outputs are connected to two parallel data lines to which each of the correlator cells 48a is connected and, in parallel, to multipliers 52; 53, each of which multiplies the output signal of the respective adder 50; 51 by −1. The multipliers 52, 53 are connected to two further data lines the correlator cells 48a are connected to. The correlator cells 48b form a second such row which is in completely analogous manner connected to a second evaluation unit 49b, which has the same structure as the first evaluation unit 49a and is connected to the two remaining input lines of the correlator 45. Consecutive correlator cells in each row are also connected. The correlator cells 48a,b are, in a very space-saving manner, implemented on the surface of the semiconductor chip carrying the base band circuit 5 as identical structures arranged in two straight rows of length N, both in parallel with the correlator shift register 47 and data lines substantially as shown in FIG. 5. In fact, two correlator cells 48a,b can always be arranged beside the cells of the correlator shift register 47 they are connected to, together with connections and sections of the data lines, integrated into a larger structure on the chip surface which is repeated identically N times along a straight line. This way the correlator 45 can be manufactured very efficiently.

Figure 6:
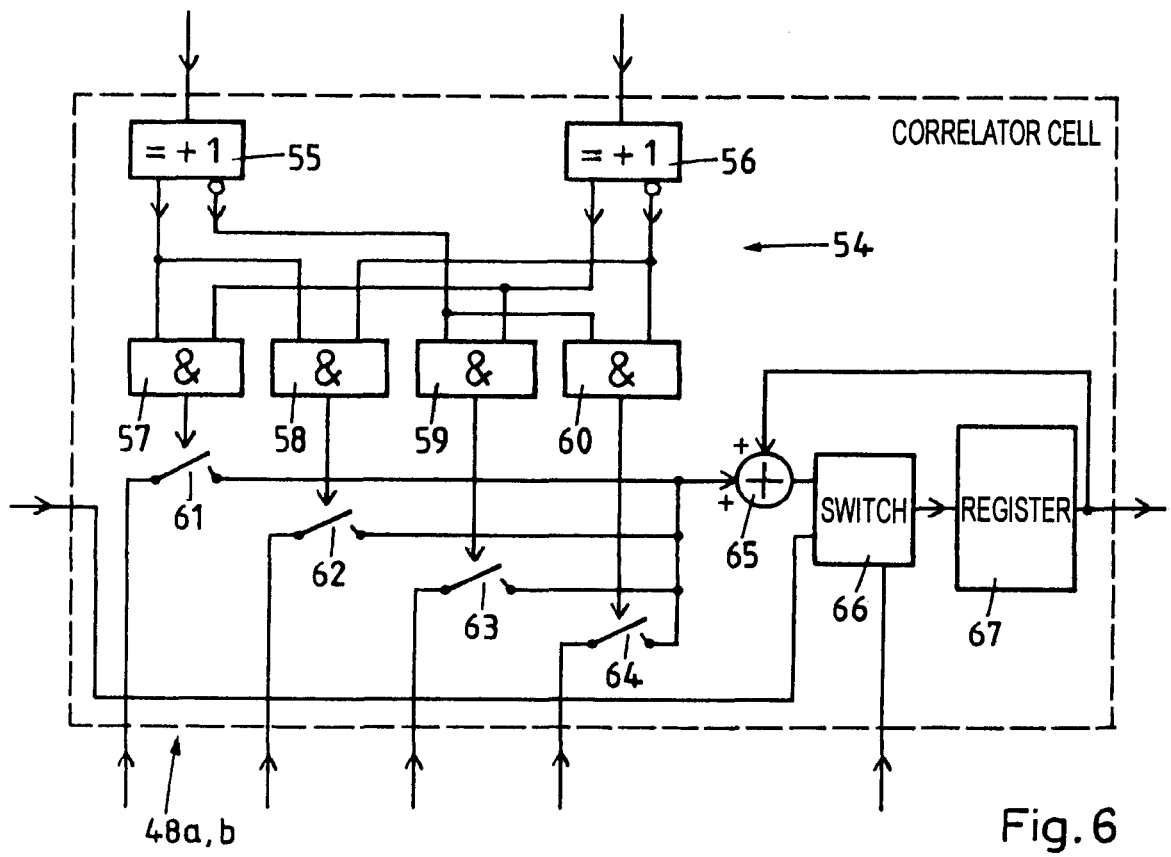
FIG. 6 shows a correlator cell of the correlator of FIG. 5

Each of the correlator cells 48a,b comprises (FIG. 6) an arbitration unit 54 with a first comparator 55 connected to a first input line and a second comparator 56 connected to a second input line with the first and second input lines connected to two consecutive cells of the correlator shift register 47. Each of the comparators 55, 56 has a direct, non-inverting output which produces a positive signal if the input value equals +1 and a negative signal if it equals −1 as well as an inverting output. To the outputs are pairwise connected inputs of four AND-gates 57, 58, 59, 60 whose outputs control switches 61; 62; 63; 64 of a switching unit, each connecting one of the data lines to an adder 65. A switch 66 connects the input of a register 67 either to the output of adder 65 or to an input which is connected to an output of the register 67 of the next correlator cell 48a;b to the left in the row or, in the case of the first correlator cell, to a register holding an initial value of zero. The output of the register 67 is connected to an input of the adder 65 and to an input of the switch 66 in the next correlator cell to the right or, in the case of the last correlator cell, to an output line of the correlator 45. Depending on the states of the switches 66 the registers 67 of the correlator cells 48a and of the correlator cells 48b are either disconnected or they form two rows of registers 67 each configured like a shift register or daisy chain.

Figure 7:
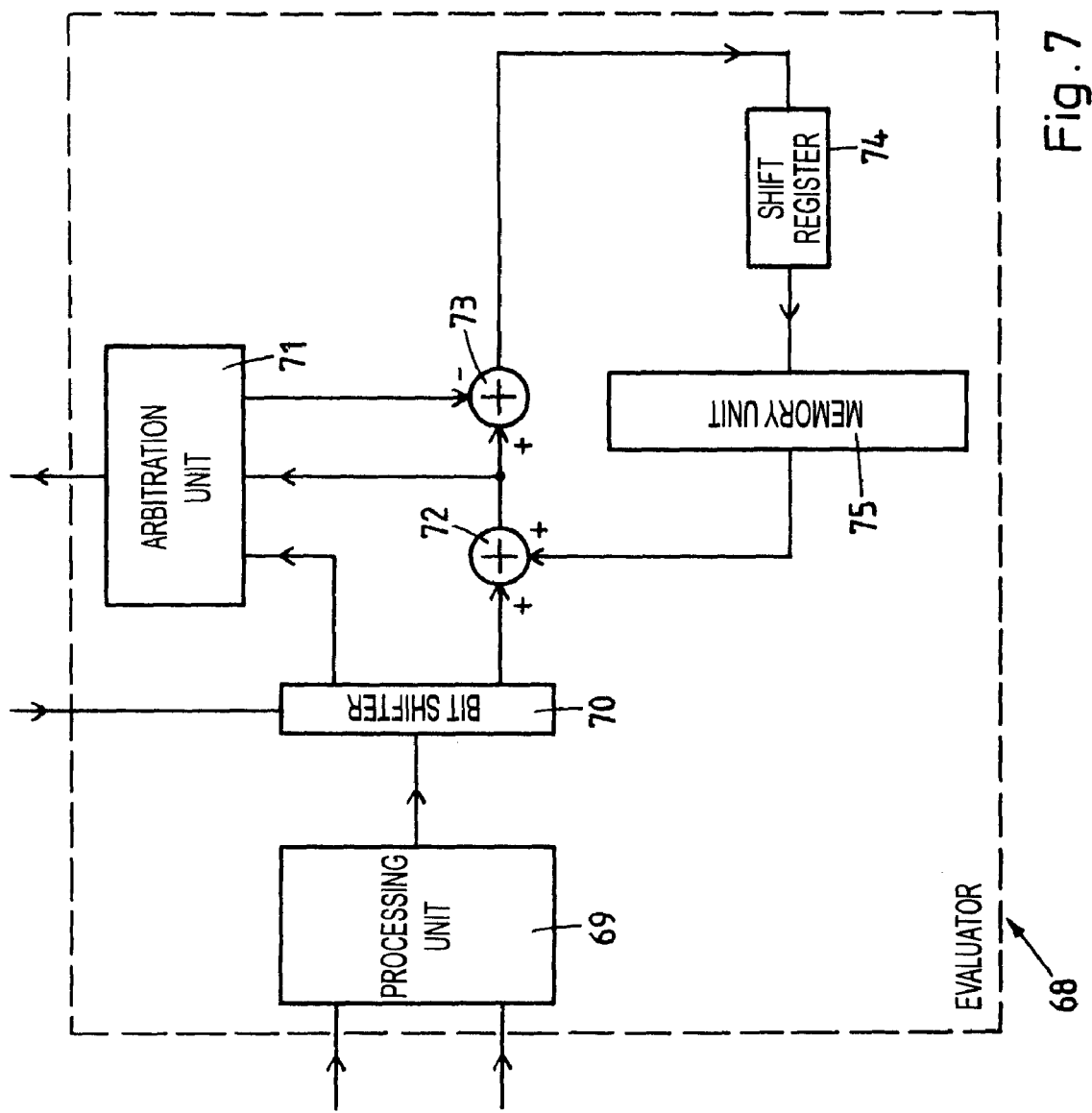
FIG. 7 shows an evaluator of the acquisition unit.

The correlator 45 is in turn followed by an evaluator 68 (FIG. 7) whose input lines are connected to a processing unit 69 and, via a bit shifter 70, to an arbitration unit 71 whose output is connected to the control unit 18, and a limiting adder 72. The output of the latter is, via another limiting adder 73 which subtracts a number delivered by the arbitration unit 71, connected to a shift register 74 with a number of memory cells which corresponds to the number N of correlator cells in one of the two rows of correlator cells 48a;b in correlator 45, and in parallel to arbitration unit 71. The shift register 74 is followed by a RAM-type memory unit 75 whose output is connected to the second input of adder 72.

In the integrator 27 an integration process is carried out over an integration period which is a multiple of the basic interval of 1 ms, e.g., over 20 ms or more. Complex samples of the digital signal, after it has been reduced to 3 bits in decimator 22, arrive at the input of the integrator 27 at a sample frequency of 8 MHz and the I and Q components are stored for the duration of a corresponding interval of approximately 0.125 µs in registers 28a; b. In each one of the preprocessors 29a to 29h the digital signal is then mixed with the output signal of the respective oscillator 41 in mixer 40 to at least in part compensate for frequency deviations caused by clock drift of the GNSS receiver and Doppler shift and convert it to eight tentatively part-compensated digital signals in parallel. Clock drift is potentially the larger of the two components and can, depending on the quality of TXCO 4 or XTO, cause frequency deviations of up to ±50 kHz. Doppler shift is typically limited to about ±4.5 kHz.

The oscillators 41 in preprocessors 29a-h produce a first group of frequency signals following exponential functions $e^{2\pi i f t}$ where in each case f is one of a number of different pre-integration frequencies which, with the possible exception of one of them, differ from frequencies which are multiples of the inverse of the basic interval of 1 ms, that is, from any multiple of 1 kHz. Usually they are chosen smaller than 1 kHz. In the example, the eight pre-integration frequencies are multiples of the inverse of the integration period, which is usually 20 ms, i.e., of 50 Hz, for instance covering the interval from −150 Hz to 200 Hz equidistantly with a 50 Hz increment. The samples of a part-compensated digital signal resulting from the mixing of the digital signal with one of the frequency signals of the said first group are then in each case accumulated over an accumulation interval of approximately the chip length, i.e., about 1 µs, by adders 43a;b each of which adds every new sample to a sum of previously accumulated samples from accumulator 44a;b and overwrites the said sum there. The sum of the samples over an accumulation interval forms in each case a sample of an accumulated digital signal.

It is possible to use only a single preprocessor with the group of frequency functions containing only a single frequency function but it is preferred that at least two, preferably more, e.g., as shown in the examplary embodiment, eight preprocessors are provided which operate in parallel. The sequence of operations—mixing of the digital signal with the frequency functions on the one hand and accumulation on the other—can be inverted with negligible loss as the variation of the frequency functions over the accumulation interval is small in general. If a very large clock drift, e.g., of an XTO need be compensated which is known approximately beforehand, the pre-integration frequencies will usually be chosen in such a way that the remaining frequency deviation is relatively small, i.e., of the order of a few kHz.

After the accumulation the resulting part-compensated and accumulated digital signal is transferred via multiplexer 30 to registers 31a;b while the content of the accumulator 44a;b is reset to zero. The accumulation can, e.g., run over eight samples normally and over seven samples for every $23^{rd}$ sum. That way 1'023 output samples of the modified part-compensated digital signal are produced in 1 ms, each of which essentially corresponds to one chip of the basic sequence as emitted by any of the GNSS satellites.

There will usually be a phase shift between the chips of a signal and the series of accumulation intervals but even in the worst case, i.e., with a phase shift of half of the chip length, correlation of the accumulated digital signal with the digital signal is still quite good at 0.5. However, if, for improved sensitivity of the acquisition process, a better lower limit for the correlation is desired or if its time resolution is to be increased, two or more of the preprocessors 29a-h can be used with the same frequency function, that is, with the same pre-integration frequency, which will yield the same part-compensated digital signal, but with different phase positions of the accumulation intervals, i.e., of the sequence formed by the boundaries between consecutive accumulation intervals, with respect to the digital signal, which yields different accumulated digital signals. The said phase positions are preferably equally distributed over the length of the accumulation interval, that is, a chip length. In particular, two of the preprocessors can be used with the same frequency function in each case and with the accumulation intervals in the second preprocessor offset by half a chip length with respect to the accumulation intervals employed in the first preprocessor. Here the worst case correlation is 0.75.

If the code used for encoding the basic sequence is a Manchester code as in the GALILEO system, with a positive value represented, e.g., by a step function which is −1 for the first half of the chip and +1 for the second half and a negative value by an inverse step function, the samples must be multiplied by values of a form function defined in the accumulation interval which in the case mentioned would also have to be a step function which equals −1 in the first half of the accumulation interval and +1 in the second. With a GPS signal such multiplication is not required as the form function is identical to +1.

The samples of the part-compensated digital signal as output by the preprocessors 29a-h are, via multiplexer 30, delivered to the registers 31a;b at a frequency of 8×1'023 MHz. The registers 31a,b, the adders 32a,b, the registers 33a,b, the memories 34, 35, the switches 36a,b, the branching units 37a,b and the mixers 38, 39 are clocked by the 48 MHz clock signal. Samples delivered from the preprocessors 29a-h to the multiplexer 30 each cause a request of the latter and are retrieved from there and processed cyclically. The registers 33a,b are connected to either memory units 34a;b or memory units 35a;b for the duration of the integration period whereas the remaining memory units 34a;b or 35a;b, respectively, are connected to the branching units 37a;b via switches 36a;b. For the sake of simplicity it is assumed in the following that memory units 34a,b are connected to the registers 33a;b and memory units 35a,b to the branching units 37a;b.

The samples stored in the registers 31a,b are fed to one input of the adder 32a;b while an intermediate digital value from a memory cell of memory unit 34a;b or, at the beginning of the integration period, a zero is fed via the register 33a;b to the other input. The result output by the adder 32a;b, i.e., the sum of the intermediate value read from the memory cell and the sample from the register 31a;b, is then output to the register 33a;b and written to the same memory cell as a new intermediate value, the previous intermediate value being overwritten. This read-modify-write cycle which requires three steps is easily feasible due to the 48 MHz clock rate.

If the integration interval is, e.g., M times the basic interval, samples of the part-compensated digital signal which pertain to the same preprocessor, that is, the same pre-integration frequency, and to the same phase, i.e., have the same position with respect to the beginning of the basic interval, are added up coherently whereby a part-compensated data sequence consisting of 1'023 digital data values pertaining to the pre-integration compensation frequency in question is formed. As a result of the integration process the signal to noise ratio of the data sequence is considerably increased in comparison with the incoming digital signal. An integration period of 20 ms which conforms to the length of a data bit is adequate for a 'cold start' where no data are known previously to acquisition. If satellite data are known beforehand inversions of the basic sequence due to modulation by data bits can be taken into account and longer integration intervals are possible.

At the same time, the memory units 35a,b can be read with a different clock rate which is independent from the rate of the integration process, e.g., 48 MHz. In any case the 1'023 data values which make up a part-compensated data sequence are read in pairs, each consisting of two consecutive data values which are then separated by branching units 37a;b and delivered to mixer 38 and mixer 39, respectively. As a consequence, of the complex digital values pertaining to the part-compensated data sequence being processed, an even-numbered data value $s_{2k}$ is fed to mixer 38 whereas at the same time the subsequent odd-numbered data value $s_{2k+1}$, derived from the input signal with a delay of one chip length with respect to $s_{2k}$, is fed to mixer 39, then $s_{2k+2}$ to mixer 38 and $s_{2k+3}$ to mixer 39 and so on, beginning with $s_0$ and $s_1$ and ending with $s_{1'022}$ and $s_{1'023}$ where the latter is set to zero.

The mixers 38, 39 can now be used to shift the part-compensated data sequence in the frequency domain by mixing it with a frequency signal following a complex exponential function $e^{2\pi iFt}$ with a frequency F which is a post-integration compensation frequency, that is, a multiple of the inverse of the length of the basic interval of 1 ms, i.e., a multiple of 1 kHz. As a consequence, the frequency signal is periodic with a period of 1 ms or a fraction thereof. It repeats itself after 1 ms and is consequently the same for samples which are superposed in the integration process and can therefore be factored in after the same.*

In this way a large frequency interval can be scanned in a relatively short time by treating every one of the compensation frequencies which are tried out as a sum of a post-integration frequency which is a multiple of 1 kHz and a pre-integration frequency which is not. In particular, the digital signal can be shifted by the eight multiples of 50 Hz indicated above in parallel in the preprocessors 29a-h and the results integrated in integrator 27 to provide a first group of part-compensated data sequences and sequentially shifted further by multiples of 1 kHz in the mixers 38, 39. The resulting tentatively fully compensated data sequences, each consisting of 1'023 digital data values, are then evaluated immediately in the correlator 45. The post-integration frequency shifts can conveniently be carried out with the same part-compensated data sequences stored in memory 34 or 35 using the 48 MHz clock rate as the process does not require the time-consuming acquisition of new data and preparation thereof by preprocessing and integration and is therefore independent from the rate of data transmission from the GNSS satellites.

As soon as sufficiently high correlation values are found the process can be terminated. Otherwise, the pre-integration frequencies can twice be shifted by 400 Hz to provide a further group of part-compensated data sequences in each case and the whole process repeated with them. The new part-compensated data sequences required can be prepared during correlation of the previous ones. Only four preprocessors, e.g., 29a-d, need be used after the second shift to cover the full pre-integration frequency interval of 1 kHz.

In the correlator 45 the I-components of the even-numbered data values $s_{2k}$ and the odd-numbered data values $s_{2k+1}$ of the fully compensated data sequence from the integrator 27, i.e., from the outputs of mixers 38; 39, are fed in parallel to evaluation unit 49a. There the I-components of the data values are added in adder 50 and adder 51 to form a first evaluation sum of $s^I_{2k}+s^I_{2k+1}$ and a second evaluation sum of $s^I_{2k}-s^I_{2k+1}$, respectively. The results are multiplied by $-1$ in multipliers 52 and 53 to form third and fourth evaluation sums of $-s^I_{2k}s^I_{2k+1}$ and $-s^I_{2k}+s^I_{2k+1}$, respectively. The four evaluation sums are fed to correlator cells 48a in parallel via the four data lines. The Q-components are fed to evaluation unit 49b where they are processed in exactly the same manner and the results fed to correlator cells 48b.

The code generator 46 generates a binary correlation sequence which usually equals the basic sequence characteristic of one of the satellites. Previously to the beginning of the correlation the code generator 46 has filled the correlator shift register 47 with the first N binary values of the correlation sequence, that is, with an initial subsequence $b_0, \ldots, b_{N-1}$ of the said correlation sequence $b_0, \ldots, b_{1'022}$ in such a way that the left-most cell of the correlator shift register 47 holds the first value $b_0$ of the correlation sequence and the right-most the $N^{th}$, $b_{N-1}$. In the following the code generator 46 generates further values of the correlation sequence, always two at a time, until the same is complete, beginning with the $(N+1)^{th}$, $b_N$.

To any of the correlator cells 48a,b two consecutive values of the correlation sequence are provided which are fed to the arbitration unit 54, a first value $b_{2k+n}$ being fed to comparator 55 and a second value $b_{2k+1+n}$ to comparator 56. n with $0 \leq n \leq N-1$ denotes the position of the correlator cell in the row with n=0 for the left-most correlator cell and reflects part of the phase shift between the correlation sequence and the data sequence.

If both $b_{2k+n}$ and $b_{2k+1+n}$ equal +1 the signals at the direct outputs of the comparators 55, 56 in the $n^{th}$ correlator cell 48a are positive and the consequently also positive output signal at the AND-Gate 57 closes switch 61 whereby the first evaluation sum $s^I_{2k}+s^I_{2k+1}$ is fed to the adder 65 where it is added to the sum of previous values stored in register 67 and the result fed to the said register where it replaces the said sum.

If $b_{2k+n}$ and $b_{2k+1+n}$ both equal $-1$ the inverting outputs of the comparators 55, 56 are positive and AND-gate 60 closes switch 64. In this case the fourth evaluation sum $-s^I_{2k}s^I_{2k+1}$ from the output of multiplier 52 of evaluation unit 49a is fed to the adder 65 and added to the sum. In similar manner AND-gate 58 closes switch 62 to feed the second evaluation sum $s^I_{2k}-s^I_{2k+1}$ from adder 51 to the adder 65 if $b_{2k+n}=+1$ and $b_{2k+1+n}=-1$ whereas AND-gate 59 closes switch 63 to feed the third evaluation sum $-s^I_{2k}+s^I_{2k+1}$ from multiplier 53 to the adder 65 if $b_{2k+n}=-1$ and $b_{2k+1+n}=+1$. The Q-components of the data values are again treated in exactly the same manner in the corresponding correlator cell 48b. In each case one of the evaluation sums is selected as a contribution value to be added to the correlation sum by the switches 61-65 which are controlled by the arbitration subsequence in such a way that the contribution value transmitted to the adder 65 always equals $b_{2k+n} \times s_{2k} + b_{2k+1+n} \times s_{2k+1}$. After that, the correlation sequence is shifted through shift register 47 by two positions, the code generator 46 producing the next two values of the correlation sequence, while a new pair of data values is read from the memory units 35a,b and fed to the correlator 45 via branching units 37a;b and mixers 38, 39.

During a correlation phase the 1'023 data values making up the fully compensated data sequence are processed in each of the correlator cells 48a,b in parallel together with the 1'023 binary correlation values making up the complete correlation sequence. At the end of the correlation phase the left-most cell of the correlator shift register 47 holds the $1'023^{rd}$ value of the correlation sequence and the right-most the $(N-1)^{th}$. In each of the correlator cells 48a,b a correlation result is determined, in the example a correlation value component which is calculated in that the actual data values, i.e., their I or Q component, respectively, are in each case in effect multiplied by the actual values from the memory cells of the correlator shift register 47 the correlator cell is connected to and the sum of the products, in adder 65, added to the correlation sum of previous results and the new correlation sum written to the register 67 via switch 66.

As two data values from the data sequence and two values of the correlation sequence are processed in parallel at every step, the time needed for correlation is cut in half.

The same principle can be used for speeding up the correlation by a larger factor, shifting the correlation sequence and the data sequence by a step length l greater than two. In general at each step an evaluation subsequence can be produced which consists of l consecutive data values $s_{lk}, s_{lk+1}, s_{lk+l-1}$ from which $2^l$ evaluation sums can be calculated in parallel. For this purpose from each one of the data values $s_{lk+p}$ with $0 \leq p \leq l-1$ two evaluation values are derived by multiplying the data value in question with a multiplicator of +1 and a multiplicator of $-1$, the corresponding evaluation values consequently equalling $s_{lk+p}$ and $-s_{lk+p}$. Afterwards all possible evaluation sums are calculated which are each a sum over evaluation values with one of the two possible evaluation values chosen for each one of the data values. This can be done by an adding unit adding up the evaluation values in each case. An adding unit can comprise an adder with l inputs part of which are inverting and a multiplier for multiplying the output signal of the adder by $-1$. In this way, two complementary evaluation sums corresponding to two complementary evaluation subsequences—where one of them is formed by inverting, i.e., multiplying by $-1$ every evaluation value of the other—can be calculated using only one adder and the multiplier and the number of adders required in total is $2^{l-1}$.

In the above example where the step length l equals two, evaluation unit 49a comprises two adding units consisting of adder 50 and multiplier 52 and adder 51 and multiplier 53, respectively. The first adding unit calculates evaluation sum $s_{2k}+s_{2k+1}$ and complementary evaluation sum $-s_{2k}-s_{2k+1}$ and the second adding unit evaluation sum $s_{2k}-s_{2k+1}$ and complementary evaluation sum $-s_{2k}+s_{2k+1}$.

In the general case in each one of the correlator cells an arbitration subsequence of the correlation sequence whose length also equals the step length l will have to be taken into account. Every one of the correlator cells is then connected to a set of l consecutive cells of the correlator shift register each of which contains one of the values of the arbitration subsequence. The sets of cells connected to two subsequent correlator cells in a row are offset by one cell, with an overlap of l-b 1 as in the case explained above in connection with FIG. 5 for l=2.

Each of the binary values of the arbitration subsequence is compared in l parallel comparators with, e.g., +1 and all combinations of the direct and the inverted results of these comparisons AND-connected in $2^1$ AND-gates. Only the AND-gate connected to the positive outputs of the comparators where the input binary value equals +1 and with the negative outputs of the comparators where the input binary value equals −1 produces a positive output signal and closes the switch connecting the adder of the correlator cell with the data line holding the evaluation sum where each of the multiplicators used to determine the evaluation value equals the binary value of the arbitration subsequence whose position in the same equals the position of the data value the evaluation value was derived from in the evaluation subsequence. This evaluation sum is thereby selected as the contribution value to be added to the correlation sum.

An implementation of the arbitration units with comparators and AND-gates is not necessarily the most efficient and has been described above because it best illustrates the principle of the arbitration step and is straightforward and easy to understand. Equivalent embodiments are of course possible and easy to find for any person skilled in the art.

As speeding up the correlation by a factor l tends to increase the size of the required evaluation units and at least in part also the arbitration units by a factor of $2^l$ the practical possibilities are limited, in particular as the speed of data value retrieval and correlation sequence generation may put further constraints on possible through-put increase. However, with a step length of l=2 the cost is bearable and the gain already very considerable because correlation tends to be a crucial bottleneck in the signal acquisition process in particular where the time-consuming preparation of the data sequences has been streamlined by the splitting of clock drift and Doppler shift compensation into pre-integration and post-integration compensation as described above.

The method explained above can also be applied—albeit with a higher penalty in circuit complexity—where the data sequence and the correlation sequence do not consist of binary values but of digital values based on some integer m>2, e.g., m=3.

When the correlation phase is finished, a read-out phase follows. The position of switch 66 is changed in every one of the correlator cells 48a,b by a control signal from control unit 18 and the input of the register 67 connected to the output of the register 67 of the previous cell. The registers 67 of the first row and the second row, respectively, are thereby connected to form a shift register or daisy chain connected to the first output and the second output, respectively, of the correlator 45. Their contents are in each case shifted to the right (FIG. 5) through the corresponding row of registers 67 and appear sequentially at the outputs of the register 67 of the last, that is, right-most of the correlator cells 48a;b, i.e., at the first output line and the second output line, respectively, of the correlator unit 45 while at the same time the registers 67 are, from the left, filled with zeros for initialization.

The N correlation results which are calculated in parallel correspond to correlations of the fully compensated data sequence pertaining to a specific compensation frequency with N copies of the correlation sequence pertaining to a specific satellite where each copy of the correlation sequence is delayed by one position, i.e., the length of one chip with respect to the previous copy in each case.

During the read-out phase, i.e., while the correlation results are sequentially delivered to the evaluator 68, the code generator 46 produces N more values of the correlation sequence which are fed through the correlator shift register 47. At the end of the read-out phase the correlator shift register 47 therefore holds a new initial subsequence beginning with the $(N+1)^{th}$ value $b_N$ of the correlation sequence in the left-most cell and ending with the $(2N)^{th}$ value $b_{2N-1}$ in the right-most cell, i.e., the part of the correlator sequence following immediately and without overlap upon the previous initial subsequence and having the same length of N.

During the next correlation phase the same data values are fed to the correlator 45 and processed in a completely analogous manner with the only difference that the phase positions of the correlation sequence with respect to the data sequence have been increased by N. With N=64, 93, 128, 256, 341, 512 or 1'023, after 16, 11, 8, 4, 3 or 2 passes or a single pass, respectively, each comprising a correlation phase and a read-out phase, 1'023 or 1'024 correlations for all relative phase positions of the correlation sequence with respect to the data sequence—with an overlap of 1 where the number of correlations equals 1'024—have been calculated and delivered to the evaluator 68.

In the example given above the data sequence is correlated with 1'023 or 1'024 copies of the basic sequence with subsequent copies shifted by one place. The time resolution is consequently one chip. Higher time resolution can be achieved using two or more of the preprocessors 29a-h with the same frequency function but different phase positions of the accumulation intervals with respect to the digital signal in each case as has been explained above. If, e.g., two preprocessors are used in this way, with the accumulation intervals offset by one half of the chip length, the correlation of the data sequence derived from the sampling which is closer aligned in phase with the digital signal, i.e., is phase-shifted by less than half a chip length with respect to the same, will usually yield the higher correlation result. The time resolution is therefore one half of a chip length. Generally, by using $K \geq 1$ preprocessors with the same frequency function and equally distributed offsets of the accumulation intervals a time resolution of 1/K times the chip length is achieved.

During each read-out phase correlation value components $C_I$, $C_Q$, corresponding to the I and Q components of the data values, are delivered from the correlator 45 to the processing unit 69 of the evaluator 68. Here they are combined to form correlation value C with $$C = max(|C_I| + |C_Q|/4,\ |C_Q| + |C_I|/4) \tag{1}$$

This expression has been found to approximate the absolute value of $(C_I, C_Q)$, i.e., $\sqrt{(C_I^2 + C_Q^2)}$ sufficiently well for evaluation purposes whereas it requires much less processing time than the calculation of the exact value. This is an important advantage since the evaluator runs at a high clock rate.

If the correlation values are generally small they are multiplied by 2, 4, 8 or 16 in bit shifter 70 which is controlled by control unit 18. In a normal mode of the evaluator 68 16 bit correlation values from a first output of the bit shifter 70 are used as correlation indicators in arbitration unit 71. The latter selects a set of largest correlation indicators and stores them as a sequence ordered by decreasing magnitude, preferably three or more of them, e.g., six, together with parameters identifying the corresponding compensation frequency and phase position. If a new correlation indicator is larger than the smallest, i.e., sixth largest, found so far it is inserted into the ordered sequence at its appropriate place and the smallest correlation indicator is dropped. The arbitration unit 71 also keeps track of the minimum and of the sum of the correlation values. At the end of a correlation the six largest correlation indicators, each together with the corresponding compensation frequency and phase position, are delivered to the control unit 18.

If a large indicator has been found for a data sequence pertaining to a particular compensation frequency this can be taken into account subsequently in the accumulation step and the integration process and also in the choice of compensation frequencies. In particular, the assessed compensation frequency gives an indication of clock drift which can be used to appropriately choose pre-integration frequencies, e.g., by adding a fixed multiple of 1 kHz to each of them and so limit the range of post-integration compensation frequencies which need to be employed in mixers 38, 39. Also, the integration step can be adapted in such a way that the coherence of the superposition is improved. The satellite-dependent Doppler shifts are usually small enough not to influence the said coherence overmuch as long as the integration period is of the order of magnitude of 100 ms or less. In the accumulation step information about the clock drift can be used for adapting the accumulation interval, e.g., by increasing or decreasing the frequency of sums taken over less than eight samples.

A complete correlation process usually consists of carrying out several correlations, each using a specific basic sequence and taking into account all possible phase positions of the same and an adequate number of compensation frequencies and possibly also different phase positions of the accumulation intervals. The basic sequences employed are usually restricted to such as are characteristic for satellites which are likely to be visible at the time. One and the same set of data sequences can normally be used for all correlations if sufficient data concerning clock drift and satellite orbits are known previously to acquisition.

If the largest correlation indicators are sufficiently pronounced compared with the average of the correlation indicators the normal mode described above yields a sufficient set of data for the control unit 18 to control the tracking unit 25 accordingly. If no or not enough sufficiently pronounced such largest correlation indicators are found clock error is a possible cause. The control unit 18 will therefore try further compensation frequencies in the integrator 27 which are either higher or lower than the frequencies employed so far.

However, a lack of sufficiently significant correlation values where the largest of them remain below a certain threshold as compared with the average may also be due to especially difficult conditions, in particular low and variable signal to noise ratio. In this case the evaluator 67 is switched to a deep search mode by the control unit 18. In this mode, a large number of correlation procedures, e.g., 100, are carried out, each with a fresh set of data values, and the resulting correlation values are superposed. That is, correlation values resulting from correlations of different data sequences but corresponding to a given basic sequence, compensation frequency and phase position are added up.

As in this case the adding-up extends over a relatively long time, e.g., 2 s overall, it is necessary to take adequate steps to keep the sums coherent with respect to phase position. To achieve this purpose the correlation sequence used in correlator 45 can, in relation to the data sequence, be shifted at fixed intervals according to the compensation frequency employed in the integrator 27, at least each time the phase-shift reaches the length of a chip.

In deep search mode, a second output of the bit shifter 70 is used which delivers 8 bit correlation values. The memory unit 75 is organised into 2×8 memory banks of 1'023 8 bit memory cells. During a correlation process with a first data sequence correlations involving two basic sequences are carried out, each with eight different compensation frequencies and 1'023 phase positions and the resulting correlation values stored in the memory unit 75 according to basic sequence, compensation frequency and phase position.

Each subsequent data sequence is correlated in the same way. When during a read-out phase a new 8 bit correlation value from the second output of bit shifter 70 is delivered to adder 72, it is added to a sum of previous correlation values corresponding to the same basic sequence, compensation frequency and phase position, which has been read from the memory unit 75. In adder 73, a minimum value from previous correlations delivered by arbitration unit 71 is subtracted to prevent overflow and the result fed to shift register 74. During the following correlation phase the content of the shift register 74 is transferred to the memory unit 75 and the sums of previous correlation values overwritten each with the corresponding new sum.

The correlation sum, i.e., the new correlation value added to the sum of previous correlation values as output by adder 72 is in each case also fed to arbitration unit 71 where it is used as a correlation indicator, that is, it is processed in essentially the same way as the individual correlation values are processed in the normal mode. The deep search mode allows signal acquisition even under the very difficult and varying conditions typical for indoor use of a GNSS receiver.

Even in deep search mode it is possible to use different phase positions of the accumulation intervals with respect to the digital signal with the same compensation frequency.

A person skilled in the art can modify the described method and base band circuit in many ways within the scope of the invention. It should also be noted that the methods according to claims 10 to 15 are independent from the way the compensation of clock drift and Doppler shift is carried out and can be employed in the context of methods which are generic or differ in other ways from the described embodiment in that respect. This is also true for the methods according to claims 16 to 19 which concern the correlation step and are in principle independent from the way the data sequence to be correlated is prepared. Similarly, the features recited in claims 23 to 25 concern only the correlator and are essentially independent of the structure of other components of the base band circuit.

List Of Reference Symbols
1 antenna
2 radio frequency circuit
3 band pass filter
4 TCXO
5 base band circuit
6 PLL unit
7 low noise amplifier
8 controllable RF amplifier
9$a,b$ mixers
10$a,b$ high pass filters
11$a,b$ low pass filters
12$a,b$ variable gain amplifiers
13 PLL unit
14 frequency divider
15$a,b$ A/D converters
16 complex mixer
17$a,b$ frequency analyzers
18 control unit
19$a,b$ decimation filters
20$a,b$ down-samplers
21 band stop unit
22 decimator
23 frequency analyzer
24 acquisition unit
25 tracking unit
26 frequency divider
27 integrator
28$a,b$ registers
29$a$-$h$ preprocessors
30 multiplexer 31a,b registers
32a,b adders
33a,b registers
34 memory
34a,b memory units
35 memory
35a,b memory units
36a,b switches
37a,b branching units
38, 39 mixers
40 mixer
41 oscillator
42a,b registers
43a,b adders
44a,b accumulators
45 correlator
46 code generator
47 correlator shift register
48a,b correlator cells
49a,b evaluation units
50, 51 adders
52, 53 multipliers
54 arbitration unit
55, 56 comparators
57-60 AND-gates
61-64 switches
65 adder
66 switch
67 register
68 evaluator
69 processing unit
70 bit shifter
71 arbitration unit
72 adder
73 adder
74 shift register
75 memory unit

The invention claimed is:

1. A GNSS receiver base band circuit with an acquisition unit for processing samples of a digital signal, the acquisition unit comprising:
at least one preprocessor with a mixer for mixing the digital signal with a plurality of frequency signals to provide a plurality of part-compensated digital signals,
at least one adder for summing up samples of each of the part-compensated digital signals separated by a length of a basic interval to provide a plurality of part-compensated data sequences and at least one memory connected to the at least one adder for storing data values of each one of the plurality of part-compensated data sequences,
at least one further mixer connected to the at least one memory and configured to mix each part-compensated data sequence with at least one frequency signal to in each case provide at least one corresponding compensated data sequence, and
a correlator connected to the at least one further mixer configured to determine at least one correlation value from the at least one corresponding compensated data sequence and a correlation sequence.

2. The GNSS receiver base band circuit of claim 1, where the at least one preprocessor further comprises at least one accumulator and at least one adder connected to the at least one accumulator, the accumulator being configured to accumulate several consecutive samples of a digital signal to in each case provide a single sample of an accumulated digital data signal at an output.

3. The GNSS receiver base band circuit of claim 2, where the at least one preprocessor comprises a mixer to an output of which the adder is connected via at least one register.

4. A GNSS receiver base band circuit with an acquisition unit for processing samples of a digital data signal, the acquisition unit comprising a correlator for determining at least one correlation value, where the correlator comprises:
a correlator shift register containing a plurality of consecutive cells for holding consecutive binary values of a correlation sequence,
at least one evaluation unit with a plurality of adding units, each configured to calculate one of a plurality of evaluation sums of possible combinations of evaluation values, each forming an evaluation subsequence whose length equals a step length, and data lines each connected to an output of one of the adding units, and
at least one correlator cell containing a register and an adder with a first input connected to an output of the register and a second input connected to each one of the data lines extending from the at least one evaluation unit via a switching unit and an arbitration unit which is connected to each cell of the correlator shift register pertaining to a set of consecutive cells whose number is equal to the step length and configured to control the switching unit according to binary values of an arbitration subsequence of the correlation sequence which are each contained in one of the cells.

5. The GNSS receiver base band circuit of claim 4, where the adding units each comprise an adder and a multiplier, the adder being configured to add up evaluation values to form one half of the plurality of evaluation sums, with an output connected to one of the data lines and to an input of the multiplier whose output is connected to a further one of the data lines, the multiplier being configured to multiply an output value of the adder by −1 to form an evaluation sum pertaining to complementary evaluation values in each case.

6. The GNSS receiver base band circuit of claim 4, where the correlator contains at least one row of correlator cells for calculating correlation values pertaining to different phase shifts of the correlation sequence with respect to the data sequence in parallel, and where the sets of consecutive cells of the correlator shift register consecutive correlator cells are connected to are offset by one cell in each case.

7. A GNSS receiver comprising a base band circuit according to claim 1 and further comprising a radio frequency circuit with at least one mixer for providing an analog signal and with at least one A/D converter for converting the analog signal to a digital signal.

8. A GNSS receiver comprising a base band circuit according to claim 4 and further comprising a radio frequency circuit with at least one mixer for providing an analog signal and with at least one AID converter for converting the analog signal to a digital signal.

9. The GNSS receiver base band circuit of claim 4, where the arbitration unit comprises:
a plurality of comparators for comparing an input value with +1, each comparator having an input connected to one of the cells of the correlator shift register pertaining to the set of consecutive cells, and a direct output and an inverting output,
a plurality of AND-gates, each with an input for every one of the comparators, the input being connected to one of the direct and inverting outputs of the comparator in each case such that every combination of the direct and inverting outputs of the comparators is connected to the inputs of one of the AND-gates, and
where the switching unit comprises a plurality of switches, each of them connecting one of the data lines with the second input of the adder, controlled by one of the AND-gates.

10. The GNSS receiver base band circuit of claim 4, where the arbitration unit comprises:
- a first comparator and a second comparator each for comparing an input value with +1 and having a direct output and inverting output, the first comparator having an input connected to a first one of the cells of the correlator shift register pertaining to a pair of consecutive cells, and the second comparator having an input connected to a second one of the said pair of cells,
- four AND-gates, each with two inputs, where a first input of a first AND-gate is connected to the direct output of the first comparator and a second input of the first AND-gate is connected to the direct output of the second comparator, a first input of a second AND-gate is connected to the direct output of the first comparator and a second input of the second AND-gate is connected to the inverting output of the second comparator, a first input of a third AND-gate is connected to the inverting output of the first comparator and a second input of the third AND-gate is connected to the direct output of the second comparator, and a first input of a fourth AND-gate is connected to the inverting output of the first comparator and a second input of the fourth AND-gate is connected to the inverting output of the second comparator, and where the switching unit comprises
- four switches, each of them connecting one of four data lines with the second input of the adder, controlled by one of the four AND-gates.

11. A GNSS receiver base band circuit with an acquisition unit for processing samples of a digital signal, the acquisition unit comprising:
- at least one preprocessor with a mixer for mixing the digital signal with a plurality of frequency signals to provide a plurality of part-compensated digital signals,
- at least one adder for summing up samples of each of the part-compensated digital signals separated by a length of a basic interval to provide a plurality of part-compensated data sequences and at least one memory connected to the at least one adder for storing data values of each one of the plurality of part-compensated data sequences,
- at least one further mixer connected to the at least one memory and configured to mix each part-compensated data sequence with at least one frequency signal that is periodic with a period of the basic interval or a fraction of the same to in each case provide at least one corresponding compensated data sequence, and
- a correlator connected to the at least one further mixer configured to determine at least one correlation value from the at least one corresponding compensated data sequence and a correlation sequence.

\* \* \* \* \*